US011156849B2

(12) United States Patent
Kobayashi et al.

(10) Patent No.: US 11,156,849 B2
(45) Date of Patent: Oct. 26, 2021

(54) ILLUMINATION UNIT AND PROJECTOR

(71) Applicant: SONY CORPORATION, Tokyo (JP)

(72) Inventors: Izushi Kobayashi, Tokyo (JP);
Yoshihisa Sato, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/766,911

(22) PCT Filed: Nov. 8, 2018

(86) PCT No.: PCT/JP2018/041519
§ 371 (c)(1),
(2) Date: May 26, 2020

(87) PCT Pub. No.: WO2019/111627
PCT Pub. Date: Jun. 13, 2019

(65) Prior Publication Data
US 2020/0372844 A1  Nov. 26, 2020

(30) Foreign Application Priority Data

Dec. 4, 2017 (JP) .............................. JP2017-232299

(51) Int. Cl.
*G09G 5/10* (2006.01)
*G02B 27/48* (2006.01)
(Continued)

(52) U.S. Cl.
CPC .......... *G02B 27/48* (2013.01); *G03B 21/204* (2013.01); *G09G 3/001* (2013.01); *H05B 47/10* (2020.01);
(Continued)

(58) Field of Classification Search
CPC ................... G09G 3/001; G09G 3/007; G09G 2320/0242; G09G 2320/041;
(Continued)

(56) References Cited

U.S. PATENT DOCUMENTS 6,683,657 B1  1/2004 Miyawaki
2006/0055894 A1  3/2006 Furihata
(Continued)

FOREIGN PATENT DOCUMENTS

CN  1746764 A  3/2006
CN  101839463 A  9/2010
(Continued)

OTHER PUBLICATIONS

International Search Report and Written Opinion of PCT Application No. PCT/JP2018/041519, dated Feb. 5, 2019, 12 pages of ISRWO.

*Primary Examiner* — Jennifer T Nguyen
(74) *Attorney, Agent, or Firm* — Chip Law Group

(57) ABSTRACT

An illumination unit of the present disclosure includes an excitation light source, a phosphor section, an excitation-light intensity distribution generation section, and an illumination optical system. The excitation light source emits excitation light. The phosphor section includes a fluorescent light-emission surface that performs fluorescent light emission in response to receiving of the excitation light. The excitation-light intensity distribution generation section is provided between the excitation light source and the phosphor section, and varies an intensity distribution of the excitation light to bring the intensity distribution of the excitation light closer to a desired excitation-light intensity distribution on the fluorescent light-emission surface. The illumination optical system generates, on the basis of light derived from the fluorescent light emission from the phosphor section, illumination light with which an image display device is to be irradiated.

9 Claims, 17 Drawing Sheets

(51) Int. Cl.
*G03B 21/20* (2006.01)
*G09G 3/00* (2006.01)
*H05B 47/10* (2020.01)

(52) U.S. Cl.
CPC ............ *G09G 2320/0242* (2013.01); *G09G 2320/041* (2013.01); *G09G 2320/0626* (2013.01); *G09G 2360/145* (2013.01)

(58) Field of Classification Search
CPC ..... G09G 2320/0626; G09G 2360/145; G02B 27/48; G02B 27/149; G03B 21/204; G03B 21/208; G03B 21/2073; G03B 21/2013
USPC .......................................................... 345/690
See application file for complete search history.

(56) References Cited

U.S. PATENT DOCUMENTS

| | | |
|---|---|---|
| 2007/0110386 A1 | 5/2007 | Chiang |
| 2009/0091718 A1* | 4/2009 | Obi ...................... H04N 9/3105 355/30 |
| 2010/0238412 A1 | 9/2010 | Kurosaki |
| 2011/0242496 A1* | 10/2011 | Kimoto .................. G03B 21/16 353/31 |
| 2013/0033651 A1* | 2/2013 | Haraguchi ........... H04N 9/3164 348/744 |
| 2014/0078472 A1 | 3/2014 | Masuda et al. |
| 2015/0177603 A1* | 6/2015 | Toyooka ............... G03B 21/142 353/31 |
| 2017/0285452 A1* | 10/2017 | Miura ...................... G02B 3/00 |
| 2018/0033357 A1* | 2/2018 | Li .......................... G03B 33/08 |

FOREIGN PATENT DOCUMENTS

| | | |
|---|---|---|
| DE | 102010002911 A1 | 11/2010 |
| JP | 2001-100699 A | 4/2001 |
| JP | 2004-226631 A | 8/2004 |
| JP | 2006-106691 A | 4/2006 |
| JP | 2007-264192 A | 10/2007 |
| JP | 2010-217566 A | 9/2010 |
| JP | 2011-227468 A | 11/2011 |
| JP | 2014-062951 A | 4/2014 |
| JP | 2014-197227 A | 10/2014 |
| JP | 2016-224451 A | 12/2016 |
| KR | 10-2010-0105404 A | 9/2010 |
| TW | 201040459 A | 11/2010 |
| WO | 2017/033369 A1 | 3/2017 |

\* cited by examiner

[FIG. 1]
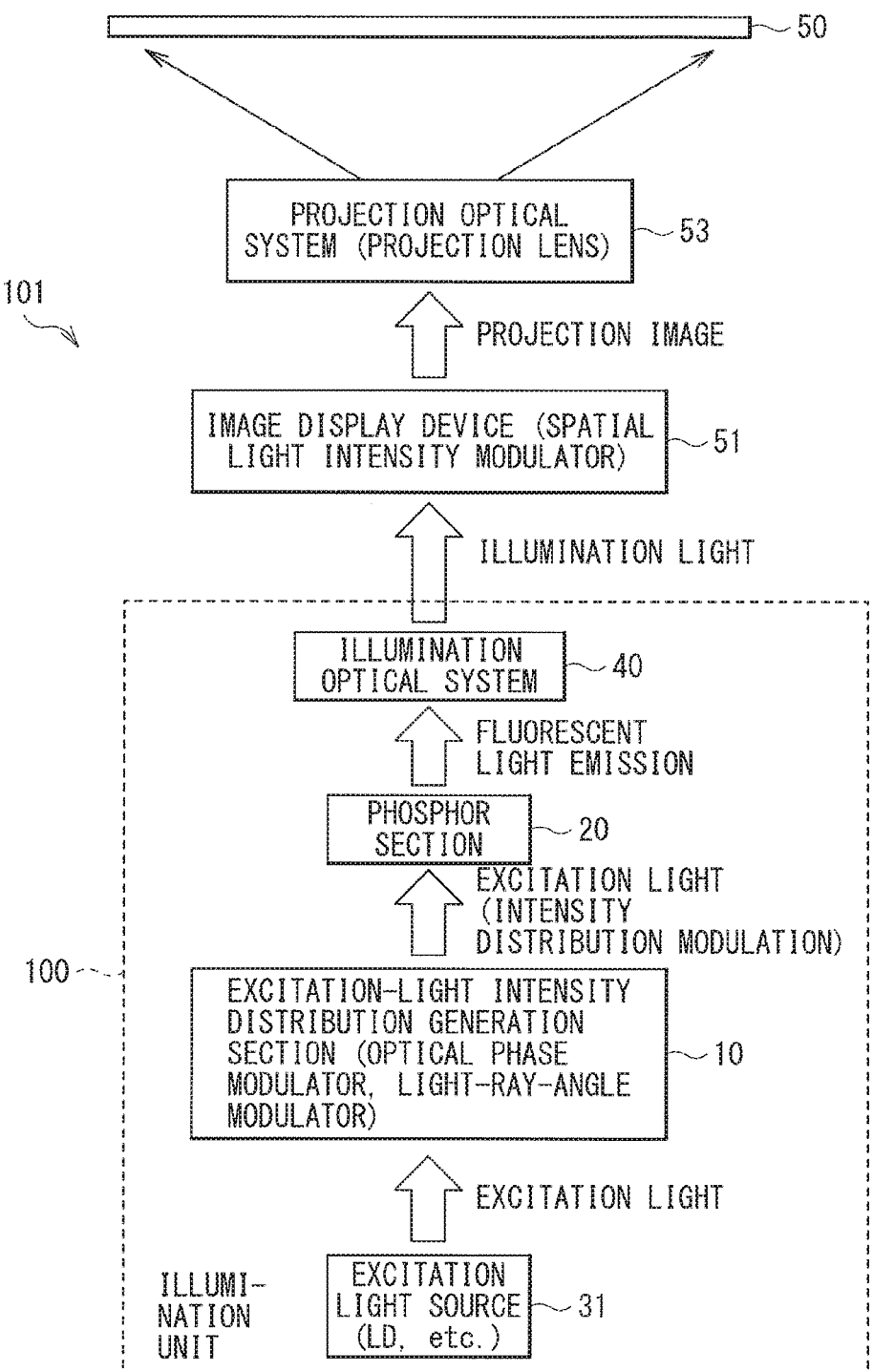

[FIG. 2]
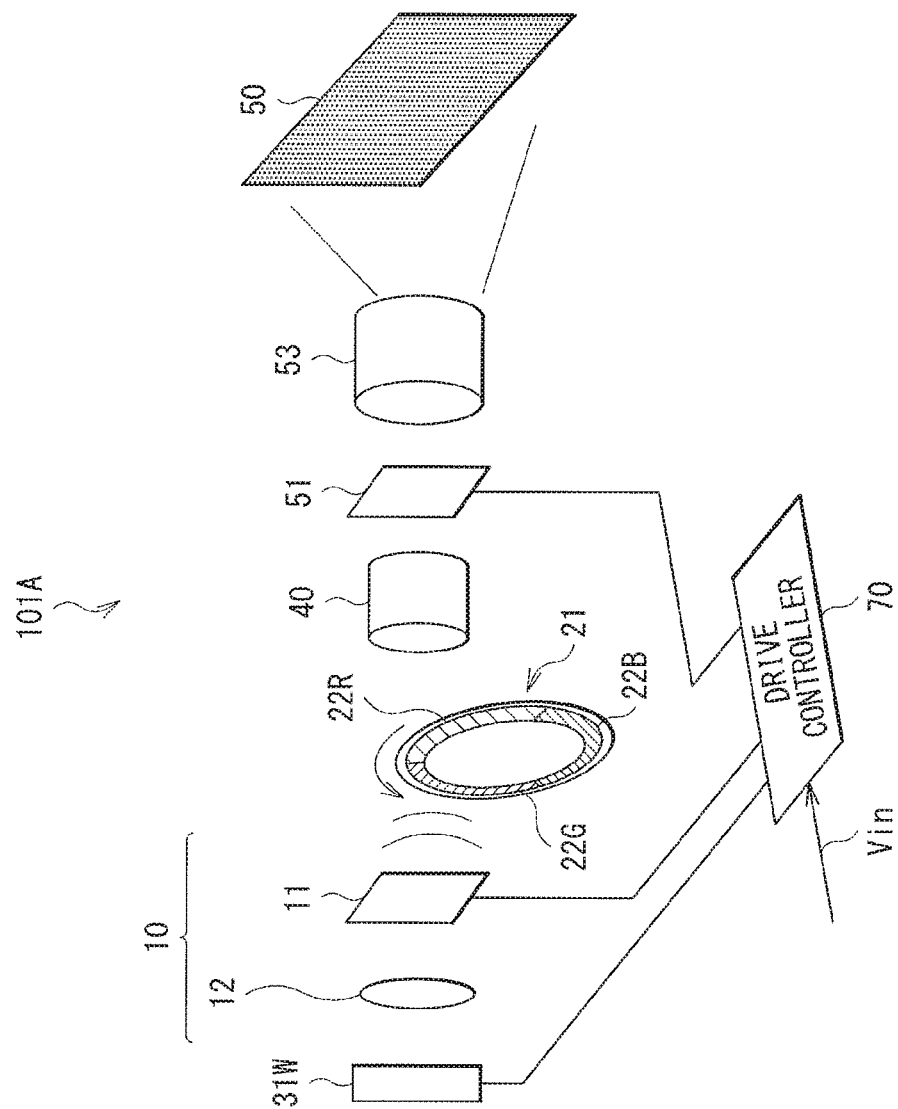

[FIG. 3]
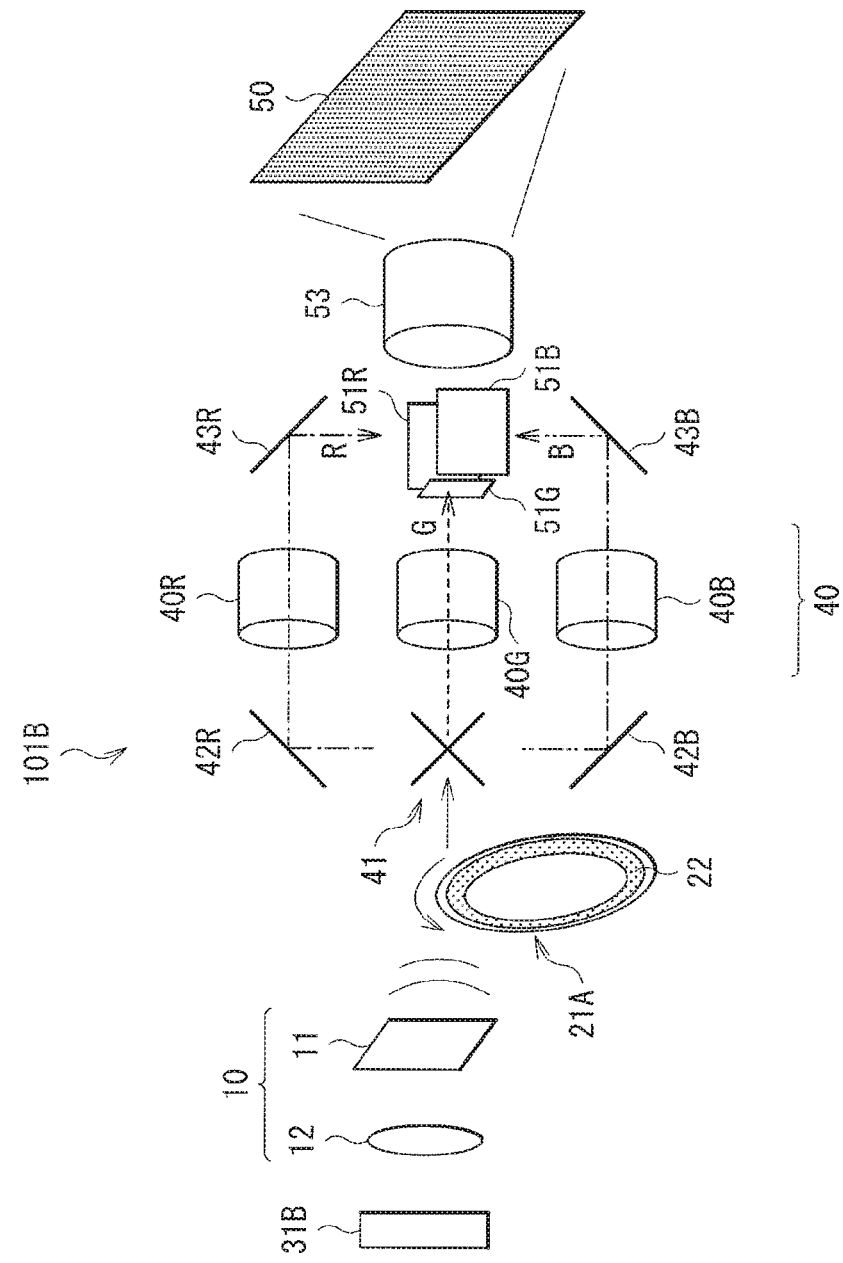

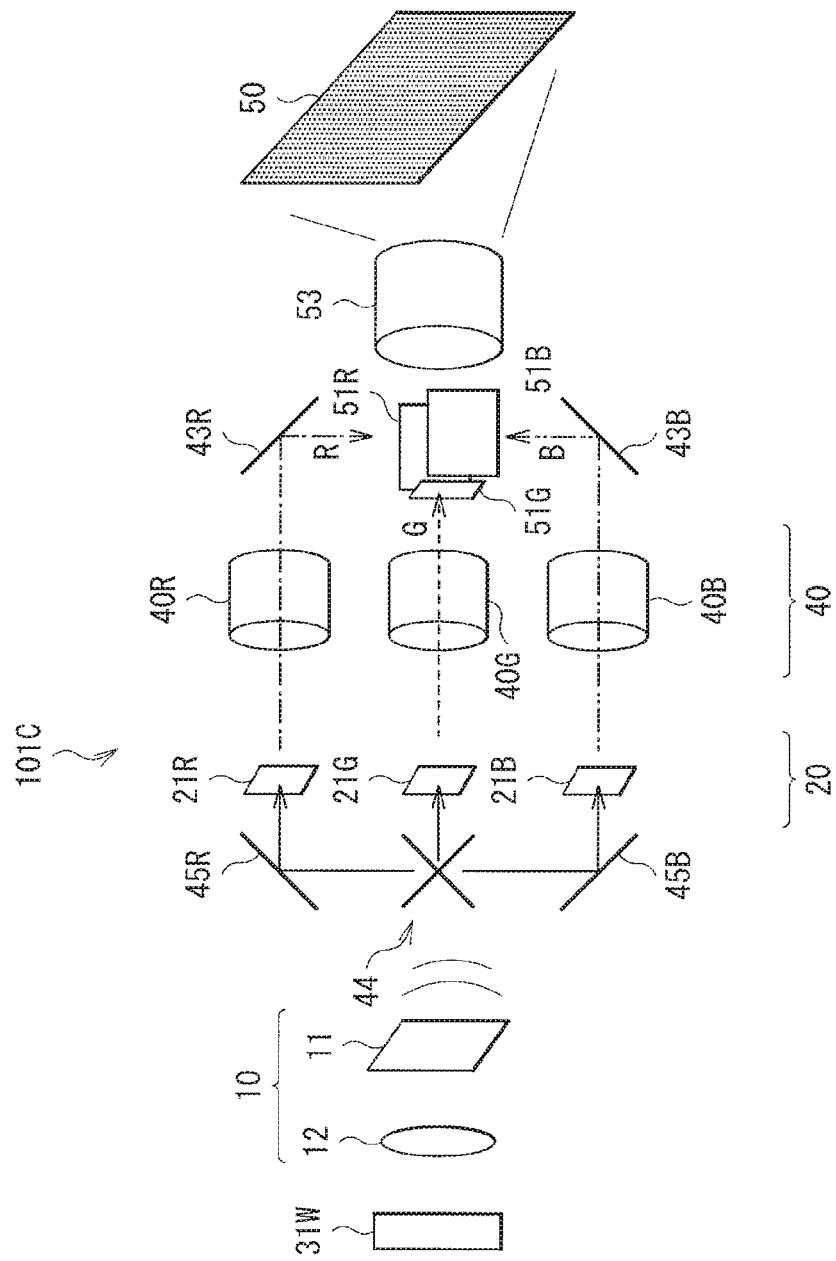
[FIG. 4]

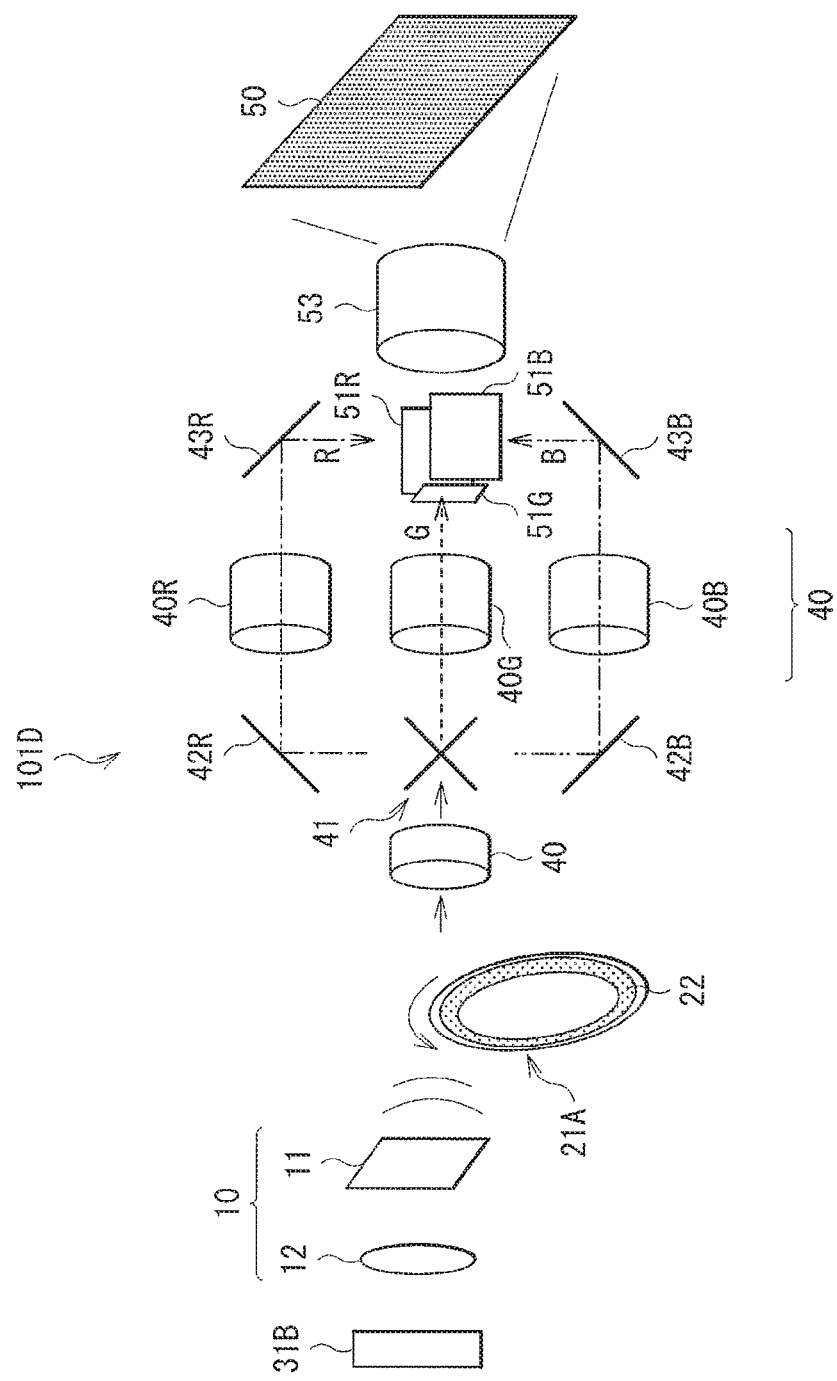
[FIG. 5]

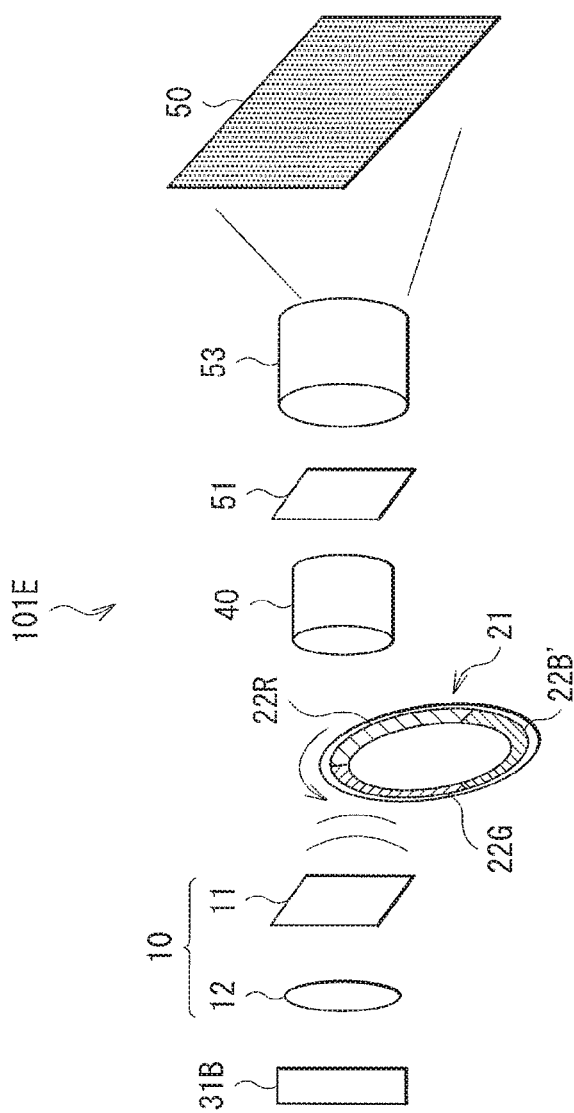
[FIG. 6]

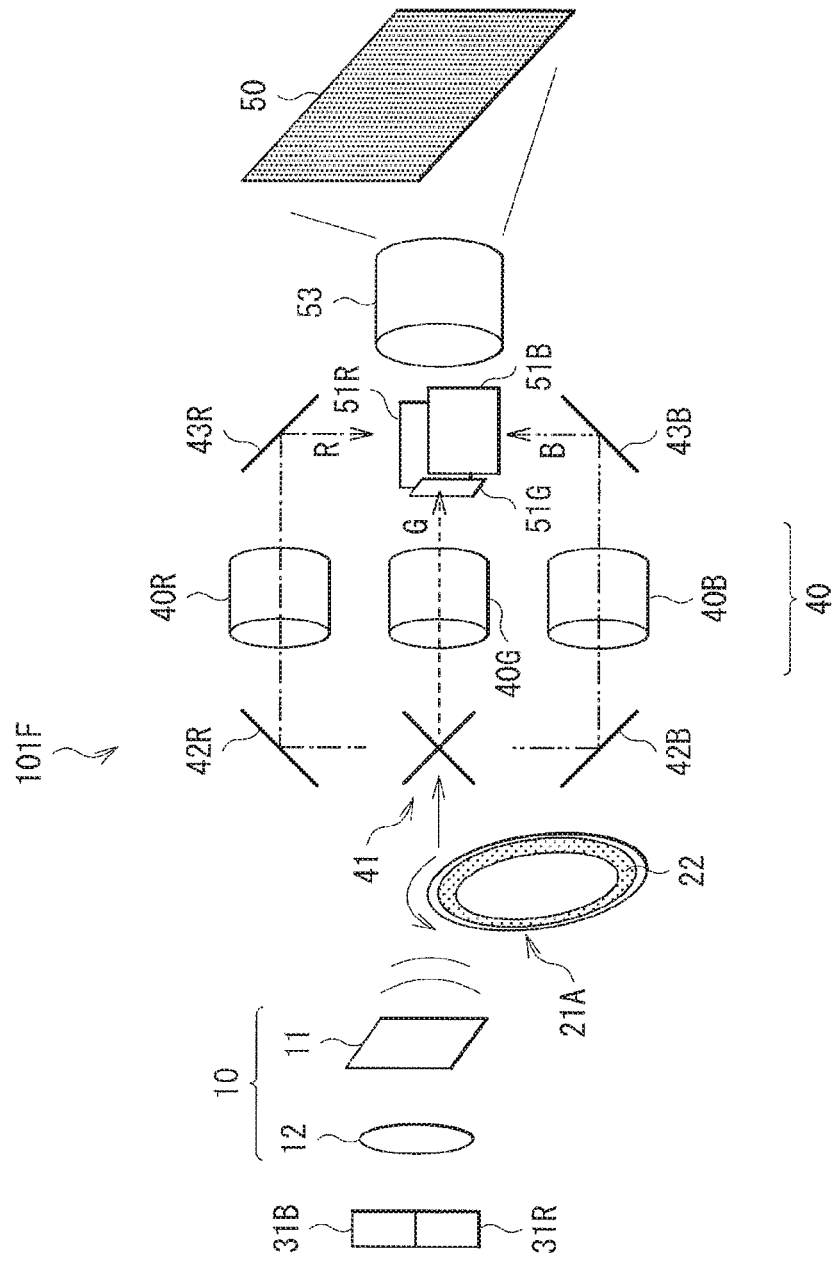
[FIG. 7]

[FIG. 8]
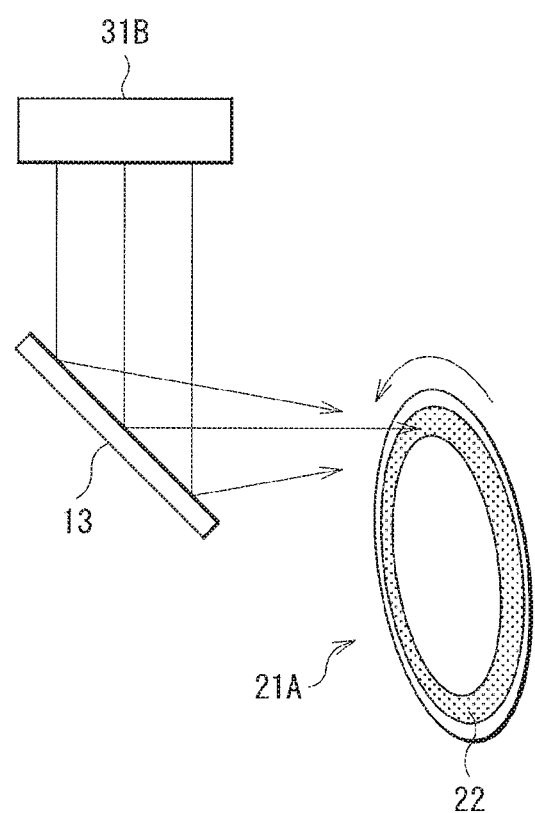

[FIG. 9]
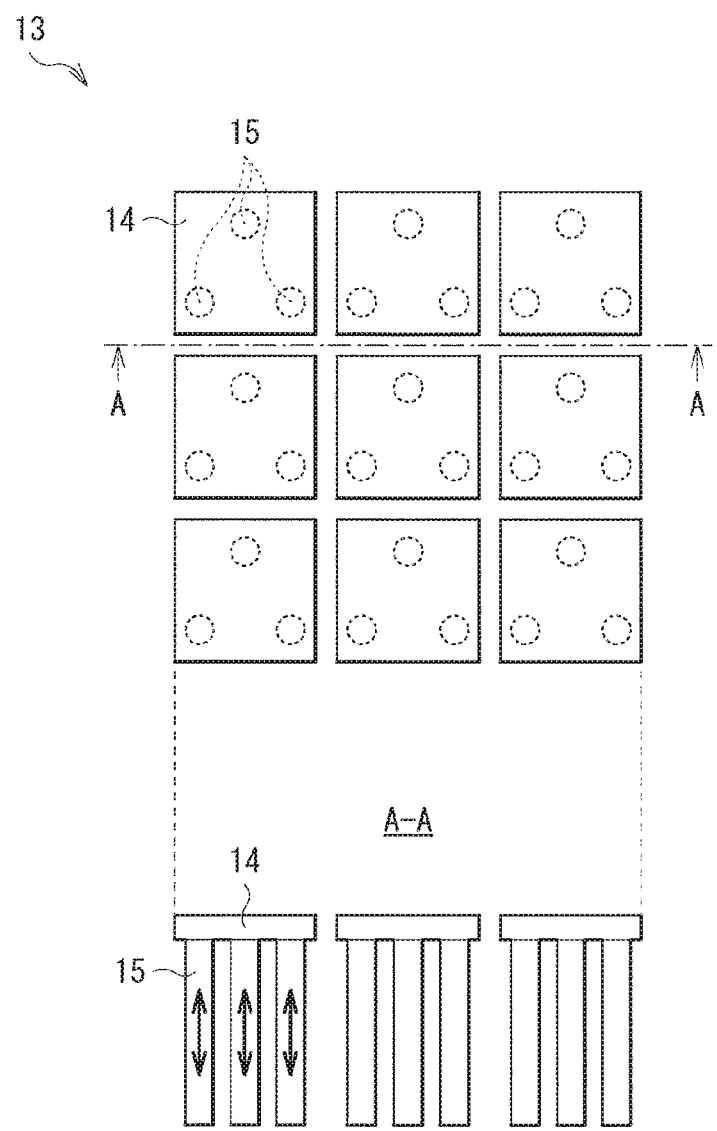

[FIG. 10]
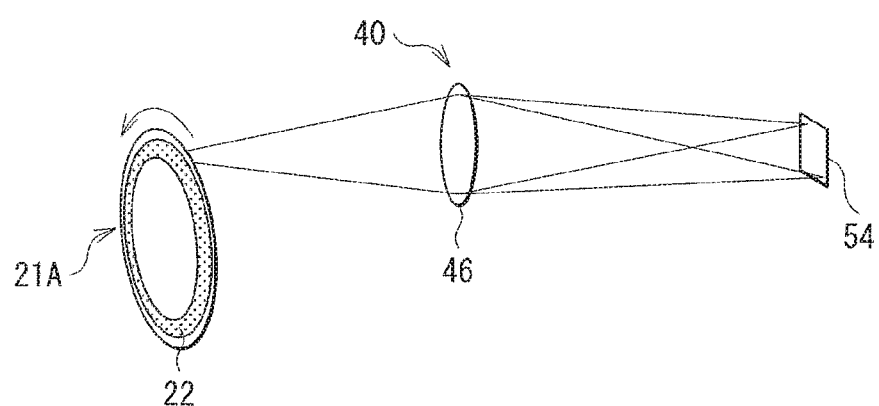
[FIG. 11]
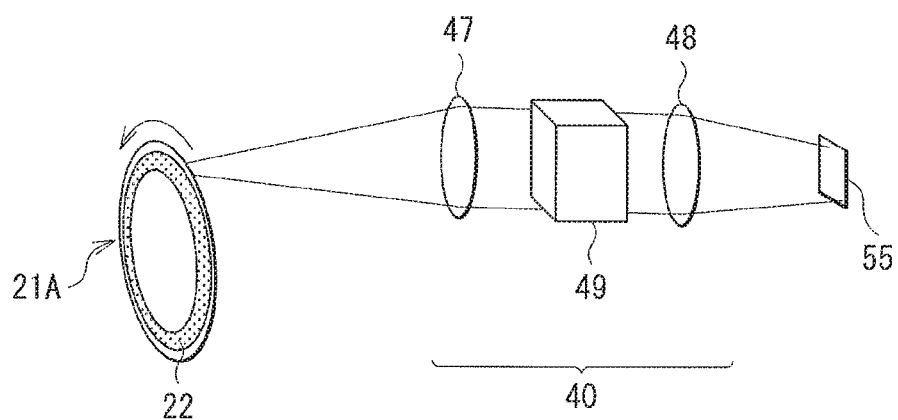

[ FIG. 12 ]
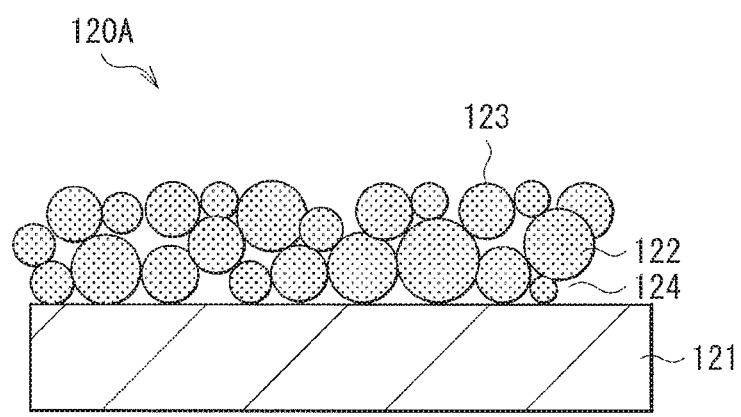
[ FIG. 13 ]
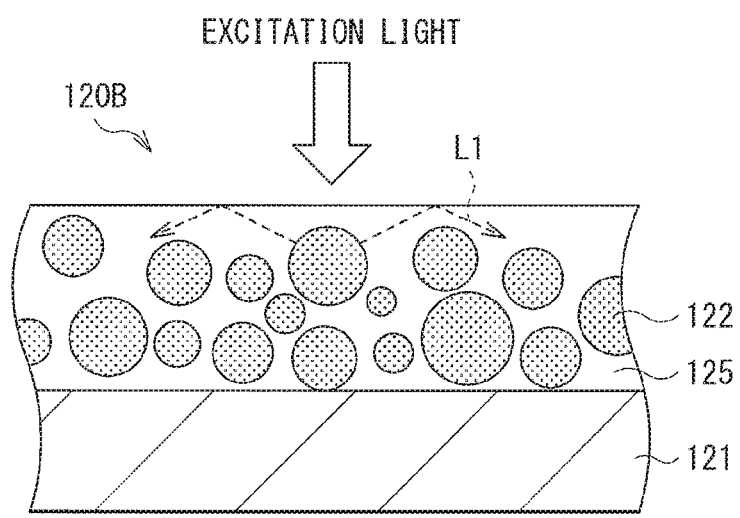

[ FIG. 14 ]
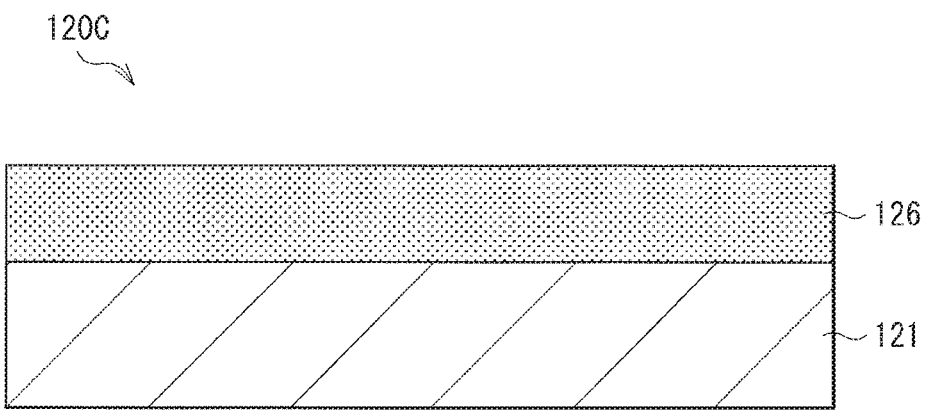

[FIG. 15]
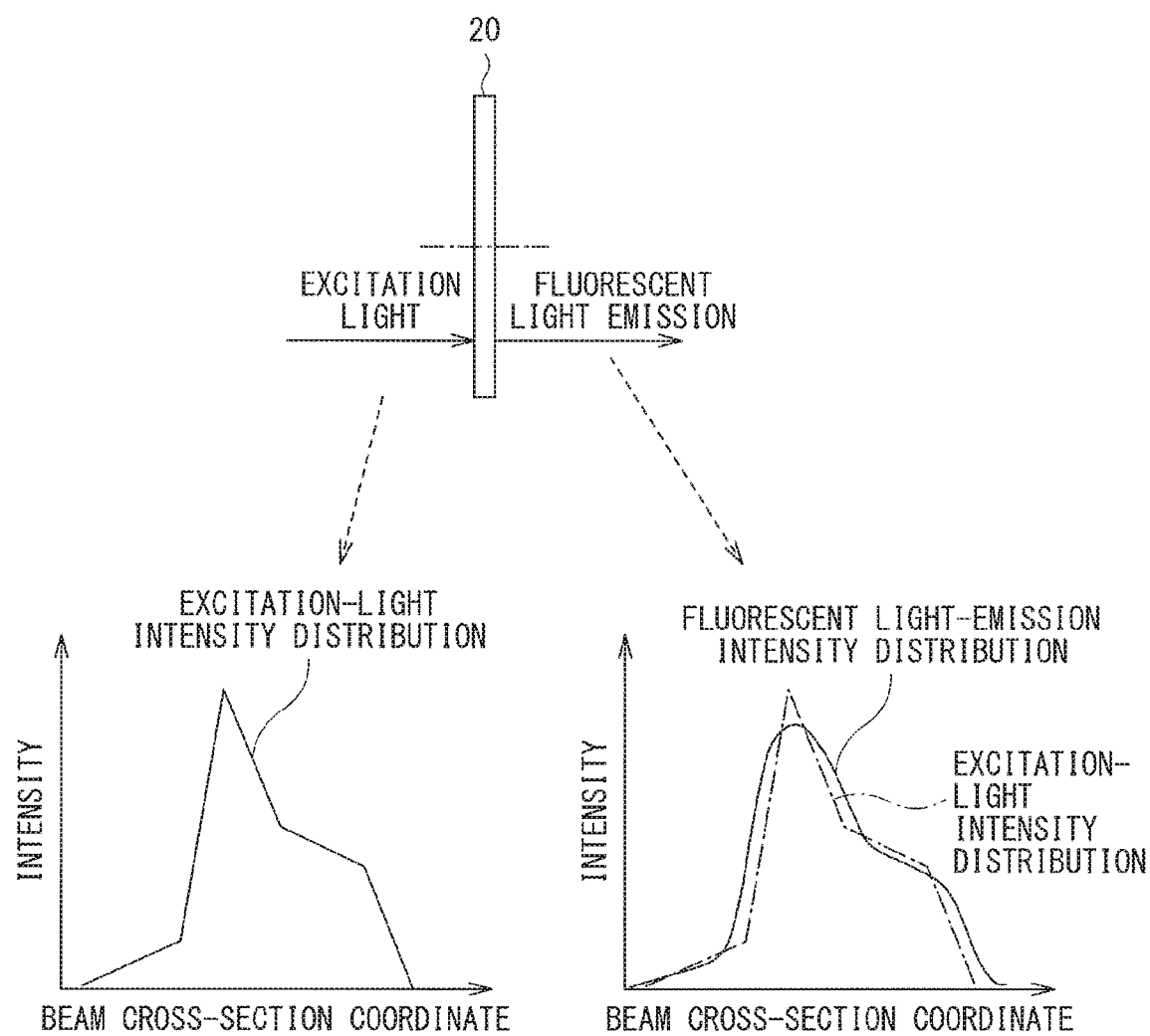

ILLUMINATION UNIT AND PROJECTOR

CROSS REFERENCE TO RELATED APPLICATIONS

This application is a U.S. National Phase of International Patent Application No. PCT/JP2018/041519 filed on Nov. 8, 2018, which claims priority benefit of Japanese Patent Application No. JP 2017-232299 filed in the Japan Patent Office on Dec. 4, 2017. Each of the above-referenced applications is hereby incorporated herein by reference in its entirety.

TECHNICAL FIELD

The present disclosure relates to an illumination unit that generates illumination light and a projector that projects an image on the basis of the illumination light.

BACKGROUND ART

There is known a projector that generates a projection image by irradiating an image display device such as a liquid crystal panel with illumination light from an illumination unit. Incidentally, in recent years, there have been demands for achievement of HDR (High Dynamic Range) of image display. As a technique of increasing a dynamic range of a projection image of a projector, there is a technique of irradiating an image display device with illumination light of an intensity distribution corresponding to an image signal (see PTL 1 and PTL 2).

CITATION LIST

Patent Literature

PTL 1: Japanese Unexamined Patent Application Publication No. 2014-197227
PTL 2: Japanese Unexamined Patent Application Publication No. 2016-224451

SUMMARY OF THE INVENTION

In the above-described technique, there is a case where it is difficult to obtain a desired illumination-light intensity distribution, depending on a method of generating the illumination light. In addition, speckles are easily generated in a case where a laser light source is used as a light source of the illumination light.

It is desirable to provide an illumination unit and a projector that make it possible to obtain a desired illumination-light intensity distribution with reduced speckles.

An illumination unit according to an embodiment of the present disclosure includes an excitation light source, a phosphor section, an excitation-light intensity distribution generation section, and an illumination optical system. The excitation light source emits excitation light. The phosphor section includes a fluorescent light-emission surface that performs fluorescent light emission in response to receiving of the excitation light. The excitation-light intensity distribution generation section is provided between the excitation light source and the phosphor section, and varies an intensity distribution of the excitation light to bring the intensity distribution of the excitation light closer to a desired excitation-light intensity distribution on the fluorescent light-emission surface. The illumination optical system generates, on the basis of light derived from the fluorescent light emission from the phosphor section, illumination light with which an image display device is to be irradiated.

A projector according to an embodiment of the present disclosure includes an illumination unit, an image display device, and a projection optical system. The image display device modulates intensity of illumination light from the illumination unit to generate a projection image. The projection optical system projects the projection image generated by the image display device onto a projection surface. The illumination unit includes an excitation light source, a phosphor section, an excitation-light intensity distribution generation section, and an illumination optical system. The excitation light source emits excitation light. The phosphor section includes a fluorescent light-emission surface that performs fluorescent light emission in response to receiving of the excitation light. The excitation-light intensity distribution generation section is provided between the excitation light source and the phosphor section, and varies an intensity distribution of the excitation light to bring the intensity distribution of the excitation light closer to a desired excitation-light intensity distribution on the fluorescent light-emission surface. The illumination optical system generates, on the basis of light derived from the fluorescent light emission from the phosphor section, the illumination light with which the image display device is irradiated.

In the illumination unit or the projector according to the embodiment of the present disclosure, the intensity distribution of the excitation light is varied by the excitation-light intensity distribution generation section provided between the excitation light source and the phosphor section to bring the intensity distribution of the excitation light closer to the desired excitation-light intensity distribution on the fluorescent light-emission surface. The illumination light with which the image display device is to be irradiated is generated on the basis of the light derived from the fluorescent light emission generated by the excitation light of the desired excitation-light intensity distribution.

BRIEF DESCRIPTION OF DRAWINGS

FIG. 1 is a block diagram illustrating an outline of an illumination unit and a projector according to a first embodiment of the present disclosure.

FIG. 2 is a configuration diagram illustrating a first specific example of an optical system of the illumination unit and the projector according to the first embodiment.

FIG. 3 is a configuration diagram illustrating a second specific example of the optical system of the illumination unit and the projector according to the first embodiment.

FIG. 4 is a configuration diagram illustrating a third specific example of the optical system of the illumination unit and the projector according to the first embodiment.

FIG. 5 is a configuration diagram illustrating a fourth specific example of the optical system of the illumination unit and the projector according to the first embodiment.

FIG. 6 is a configuration diagram illustrating a fifth specific example of the optical system of the illumination unit and the projector according to the first embodiment.

FIG. 7 is a configuration diagram illustrating a sixth specific example of the optical system of the illumination unit and the projector according to the first embodiment.

FIG. 8 is a configuration diagram illustrating an example of a main portion of an illumination unit using a light-ray-angle modulator.

FIG. 9 is a configuration diagram illustrating an example of the light-ray-angle modulator.

FIG. 10 is a configuration diagram illustrating a first example of an illumination optical system.

FIG. 11 is a configuration diagram illustrating a second example of the illumination optical system.

FIG. 12 is a cross-sectional view of a first specific example of a configuration of a phosphor section.

FIG. 13 is a cross-sectional view of a second specific example of the configuration of the phosphor section.

FIG. 14 is a cross-sectional view of a third specific example of the configuration of the phosphor section.

FIG. 15 is an explanatory diagram illustrating an example of a relationship between an excitation-light intensity distribution and a fluorescent light-emission intensity distribution.

MODES FOR CARRYING OUT THE INVENTION

Figure 16:
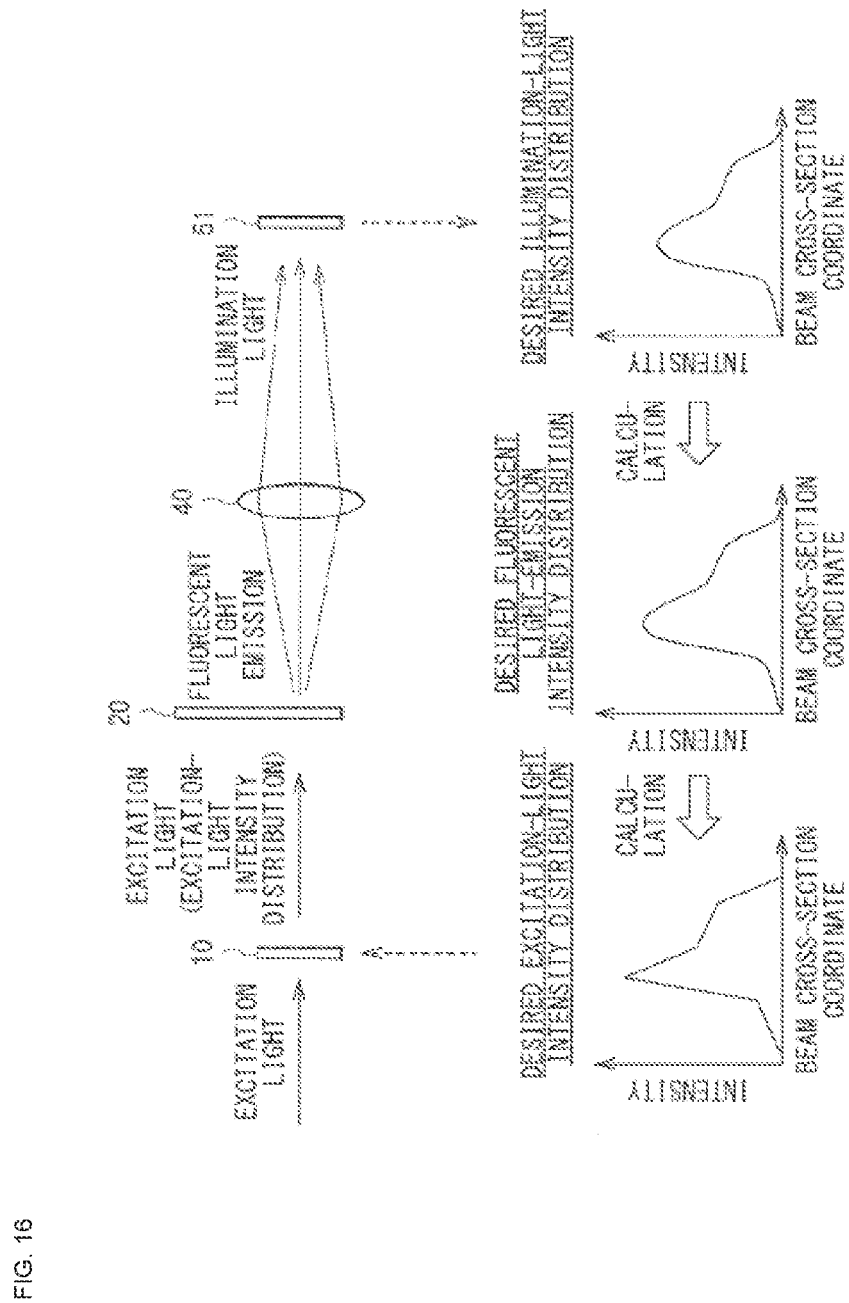
FIG. 16 is an explanatory diagram illustrating an example of computation for determination of a desired excitation-light intensity distribution from a desired illumination-light intensity distribution.

Some embodiments of the present disclosure are described below in detail with reference to the drawings. It is to be noted that the description is given in the following order.
0. Comparative Example
1. First Embodiment (FIG. 1 to FIG. 17)
   1.1 Outline of Optical System of Illumination Unit and Projector
   1.2 Specific Examples of Optical System of Illumination Unit and Projector
   1.3 Configuration Examples of Light-ray-angle Modulator
   1.4 Configuration Examples of Illumination Optical System
   1.5 Configuration Examples of Phosphor Section
   1.6 Computation Examples of Excitation-light Intensity Distribution
   1.7 Specific Configuration Examples Including Control System of Illumination Unit and Projector
   1.8 Effects
2. Second Embodiment (FIG. 18 and FIG. 19)
   2.1 Configurations and Operation
   2.2 Effects
3. Other Embodiments 0. Comparative Example As a general projector, there is known a projector configured to generate an image by irradiating a spatial light intensity modulator serving as an image display device with uniform illumination light and performing light intensity modulation, and to project the generated image onto a screen through a projection lens. For the image display device, a liquid-crystal display panel, a DMD (Digital Micro-mirror Device), a MEMS (Micro Electro Mechanical Systems), or the like is used.

As a technique of increasing a dynamic range of a projection image of such a projector, there is a method of performing intensity modulation on output light from a light source depending on an image signal by use of a light intensity modulator, and irradiating an image display device with illumination light of an intensity distribution corresponding to the image signal. In this method, however, while it is possible to further darken a shade portion of the projection image, it is difficult to further brighten a bright portion of the projection image. Further, as a technique of increasing a dynamic range of a projection image, there is, for example, a method of performing phase modulation on light from a laser light source depending on an image signal with use of an optical phase modulator, and irradiating an image display device with illumination light of a phase distribution corresponding to the image signal.

In this method, it is possible to increase a dynamic range by further brightening a bright portion of a projection image. In this method, however, speckles peculiar to laser are generated because the laser light source is used. For this reason, illumination efficiency is decreased and cost is increased to remove the speckles.

Accordingly, development of a technique that makes it possible to obtain a desired illumination-light intensity distribution while reducing speckles is desired.

1. First Embodiment 1.1 Outline of Optical System of Illumination Unit and Projector FIG. 1 illustrates an outline of an illumination unit 100 and a projector 101 according to a first embodiment of the present disclosure.

The projector 101 includes the illumination unit 100, an image display device 51, and a projection lens 53.

The image display device 51 is a light intensity modulator that performs intensity modulation of illumination light from the illumination unit 100 to generate a projection image. The image display device 51 includes, for example, a liquid-crystal display panel, a DMD, an MEMS, or the like.

The projection lens 53 is a projection optical system including a plurality of lenses, and projects the projection image generated by the image display device 51 onto a projection surface such as a screen 50.

The illumination unit 100 includes an excitation light source 31, an excitation-light intensity distribution generation section 10, a phosphor section 20, and an illumination optical system 40.

The excitation light source 31 includes, for example, a laser light source (LD: Laser Diode), and emits excitation light that excites a phosphor of the phosphor section 20. It is to be noted that a LED (Light Emitting Diode) may be used as the excitation light source 31.

The phosphor section 20 includes a fluorescent light-emission surface that performs fluorescent light emission in response to receiving of the excitation light emitted by the excitation light source 31. As described later, the phosphor section 20 includes, for example, a phosphor wheel that rotates. Further, the phosphor section 20 may be a fixed phosphor section.

The illumination optical system 40 generates illumination light for irradiation of the image display device 51 on the basis of light derived from the fluorescent light emission from the phosphor section 20.

The excitation-light intensity distribution generation section 10 is provided between the excitation light source 31 and the phosphor section 20. The excitation-light intensity distribution generation section 10 so varies an intensity distribution of the excitation light emitted by the excitation light source 31 as to bring the intensity distribution of the excitation light closer to a desired excitation-light intensity distribution, on the fluorescent light-emission surface of the phosphor section 20. The excitation-light intensity distribution generation section 10 includes an optical phase modulator that modulates a phase of excitation light. The optical phase modulator may be an SLM (Spatial Light Modulator) or the like. Further, the excitation-light intensity distribution generation section 10 may include a light-ray-angle modulator that varies a light ray angle of excitation light as described later, in place of the optical phase modulator.

Here, the desired excitation-light intensity distribution is determined on the basis of an image signal, as described later. To be more specific, a desired illumination-light intensity distribution for irradiation of the image display device 51 is determined on the basis of the image signal, and a desired fluorescent light-emission intensity distribution derived from fluorescent light emission is determined on the basis of the determined desired illumination-light intensity distribution. Further, the desired excitation-light intensity distribution is determined on the basis of the determined desired fluorescent light-emission intensity distribution.

In the excitation-light intensity distribution generation section 10, the intensity distribution of the excitation light emitted by the excitation light source 31 is so varied as to obtain the desired fluorescent light-emission intensity distribution back-calculated from the desired illumination-light intensity distribution described above. As a result, the image display device 51 is irradiated with illumination light of the desired illumination-light intensity distribution, and this makes it possible to increase a dynamic range of the projection image.

1.2 Specific Examples of Optical System of Illumination Unit and Projector

Next, specific configuration examples of the optical system of the illumination unit 100 and the projector 101 illustrated in FIG. 1 are described. It is to be noted that, in the following specific examples, components approximately the same as those of the projector 101 in FIG. 1 are denoted by the same reference numerals, and the description thereof is omitted where appropriate.

A configuration example of a projector that performs color display is described below. Display systems of projectors that perform color display are roughly classified into a single-panel system using only one image display device 51 (an image display panel), and a three-panel system including an image display panel for each of R (red), G (green), and B (blue).

First Specific Example of Optical System

FIG. 2 illustrates an outline of an optical system of a projector 101A according to a first specific example.

The projector 101A is configured to perform full color display in a time-divisional system, using the one image display device 51. The projector 101A includes an excitation light source 31W that emits excitation light. The projector 101A includes an excitation optical system 12, an optical phase modulator 11, a phosphor wheel 21, and the illumination optical system 40, in order from excitation light source 31W side toward image display device 51 side.

The projector 101A further includes a drive controller 70 that controls the excitation light source 31W, the optical phase modulator 11, and the image display device 51, on the basis of an image signal Vin.

The excitation light source 31W is a laser light source that emits, for example, white light as the excitation light.

The excitation optical system 12 and the optical phase modulator 11 are included in the excitation-light intensity distribution generation section 10. The optical phase modulator 11 includes, for example, a transmission-type phase modulation liquid crystal panel.

The illumination optical system 40 is, for example, a critical illumination system.

The phosphor wheel 21 is included in the phosphor section 20. The phosphor wheel 21 includes a red fluorescent light-emission surface 22R, a green fluorescent light-emission surface 22G, and a blue fluorescent light-emission surface 22B. The red fluorescent light-emission surface 22R includes a red phosphor, and performs red fluorescent light emission in response to receiving of the excitation light from the excitation light source 31W via the excitation-light intensity distribution generation section 10. The green fluorescent light-emission surface 22G includes a green phosphor, and performs green fluorescent light emission in response to receiving of the excitation light from the excitation light source 31W via the excitation-light intensity distribution generation section 10. The blue fluorescent light-emission surface 22B includes a blue phosphor, and performs blue fluorescent light emission in response to receiving of the excitation light from the excitation light source 31W via the excitation-light intensity distribution generation section 10.

Each of the red fluorescent light-emission surface 22R, the green fluorescent light-emission surface 22G, and the blue fluorescent light-emission surface 22B is time-divisionally irradiated with the excitation light by rotation of the phosphor wheel 21. Each of red light, green light, and blue light derived from the fluorescent light emission is thereby time-divisionally outputted from the phosphor wheel 21.

The optical phase modulator 11 so time-divisionally varies the intensity distribution of the excitation light as to bring the intensity distribution of the excitation light closer to the desired excitation-light intensity distribution for each of the colors. The light of each of the colors of the desired fluorescent light-emission intensity distribution derived from the fluorescent light emission is thereby time-divisionally outputted from the phosphor wheel 21. As a result, the image display device 51 is time-divisionally irradiated with the illumination light of each of the colors of the desired illumination-light intensity distribution via the illumination optical system 40.

The image display device 51 time-divisionally generates a projection image of each of the colors, with respect to the illumination light of the corresponding color, in synchronization with timing of the irradiation with the light of each of the colors. The projection image of each of the colors of the red light, the green light, and the blue light is outputted toward the projection lens 53. The projection lens 53 time-divisionally projects the projection image of each of the colors onto a projection surface such as the screen 50.

Second Specific Example of Optical System

FIG. 3 illustrates an outline of an optical system of a projector 101B according to a second specific example.

The projector 101B is configured to perform full color display, using the three image display devices 51 for R, G, and B. The projector 101B includes a red image display device (a red spatial light intensity modulator) 51R, a green image display device (a green spatial light intensity modulator) G, and a blue image display device (a blue spatial light intensity modulator) 51B, as the three image display devices 51.

The projector 101B includes an excitation light source 31B that emits excitation light. The projector 101B includes the excitation optical system 12, the optical phase modulator 11, the phosphor section 20, and the illumination optical system 40, in order from excitation light source 31B side toward the image display device 51 side.

The projector 101B includes, in a manner approximately similar to that of the projector 101A illustrated in FIG. 2, the drive controller 70 that controls the excitation light source 31B, the optical phase modulator 11, and the image display device 51 on the basis of the image signal Vin, although not illustrated.

The excitation light source 31B is a laser light source that emits, for example, blue light as the excitation light.

The projector 101B includes a phosphor wheel 21A as the phosphor section 20. The phosphor wheel 21A includes, for example, a fluorescent light-emission surface 22 including a YAG phosphor, and performs fluorescent light emission of yellow in response to receiving of the excitation light from the excitation light source 31B via the excitation-light intensity distribution generation section 10. Yellow light derived from the fluorescent light emission and blue light derived from the excitation light of blue diffused on and passing through the fluorescent light-emission surface 22 are outputted from the phosphor wheel 21A. The yellow light includes red light and green light.

The projector 101B includes a color separation section 41, a reflecting mirror 42R, and a reflecting mirror 42B that are provided between the optical phase modulator 11 and the phosphor section 20.

The projector 101B further includes a red illumination optical system 40R, a green illumination optical system 40G, and a blue illumination optical system 40B, as the illumination optical system 40. Each of the red illumination optical system 40R, the green illumination optical system 40G, and the blue illumination optical system 40B is, for example, a critical illumination system.

The projector 101B further includes a reflecting mirror 43R and a reflecting mirror 43B that are provided between the illumination optical system 40 and the image display device 51.

The color separation section 41 separates the yellow light and the blue light outputted from the phosphor wheel 21A into red light, green light, and blue light.

On an optical path of the red light resulting from separation by the color separation section 41, the reflecting mirror 42R, the red illumination optical system 40R, the reflecting mirror 43R, and the red image display device 51R are provided in order.

Further, on an optical path of the green light resulting from separation by the color separation section 41, the green illumination optical system 40G and the green image display device G are provided in order.

On an optical path of the blue light resulting from separation by the color separation section 41, the reflecting mirror 42B, the blue illumination optical system 40B, the reflecting mirror 43B, and the blue image display device 51B are provided in order.

The optical phase modulator 11 so varies the intensity distribution of the excitation light as to bring the intensity distribution of the excitation light closer to the desired excitation-light intensity distribution. Light of the desired fluorescent light-emission intensity distribution derived from the fluorescent light emission is thereby outputted from the phosphor wheel 21A. As a result, each of the red image display device 51R, the green image display device G, and the blue image display device 51B is irradiated with the illumination light of the corresponding color of the desired illumination-light intensity distribution via the illumination optical system 40.

The red image display device 51R, the green image display device G, and the blue image display device 51B each generate a projection image of the corresponding color, with respect to the illumination light of the corresponding color. The projection image of the color of each of the red light, the green light, and the blue light is subjected to color composition by an unillustrated color composition optical system, and is outputted toward the projection lens 53. The projection lens 53 projects the projection image subjected to the color composition onto the projection surface such as the screen 50.

Third Specific Example of Optical System

FIG. 4 illustrates an outline of an optical system of a projector 101C according to a third specific example.

The projector 101C is configured to perform full color display, using the three image display devices 51 for R, G, and B. The projector 101C includes the red image display device (the red spatial light intensity modulator) 51R, the green image display device (the green spatial light intensity modulator) G, and the blue image display device (the blue spatial light intensity modulator) 51B, as the three image display devices 51.

The projector 101C includes the excitation light source 31W that emits the excitation light. The projector 101C includes the excitation optical system 12, the optical phase modulator 11, the phosphor section 20, and the illumination optical system 40, in order from the excitation light source 31W side toward the image display device 51 side.

The projector 101C includes, in a manner approximately similar to that of the projector 101A illustrated in FIG. 2, the drive controller 70 that controls the excitation light source 31W, the optical phase modulator 11, and the image display device 51 on the basis of the image signal Vin, although not illustrated.

The excitation light source 31W is a laser light source that emits, for example, a white light as the excitation light.

The projector 101C includes a red phosphor section 21R, a green phosphor section 21G, and a blue phosphor section 21B, as the phosphor section 20. The red phosphor section 21R, the green phosphor section 21G, and the blue phosphor section 21B are each disposed being fixed. The red phosphor section 21R includes a fluorescent light-emission surface including a red phosphor, and performs red fluorescent light emission in response to receiving of the excitation light from the excitation light source 31W via the excitation-light intensity distribution generation section 10. The green fluorescent light-emission surface 22G includes a green phosphor, and performs green fluorescent light emission in response to receiving of the excitation light from the excitation light source 31W via the excitation-light intensity distribution generation section 10. The blue fluorescent light-emission surface 22B includes a blue phosphor, and performs blue fluorescent light emission in response to receiving of the excitation light from the excitation light source 31W via the excitation-light intensity distribution generation section 10.

The projector 101C includes a branching optical system 44, a reflecting mirror 45R, and a reflecting mirror 45B that are provided between the optical phase modulator 11 and the phosphor section 20.

The projector 101C further includes the red illumination optical system 40R, the green illumination optical system 40G, and the blue illumination optical system 40B, as the illumination optical system 40. Each of the red illumination optical system 40R, the green illumination optical system 40G, and the blue illumination optical system 40B is, for example, a critical illumination system.

The projector 101C further includes the reflecting mirror 43R and the reflecting mirror 43B that are provided between the illumination optical system 40 and the image display device 51.

The projector 101C includes the branching optical system 44, the reflecting mirror 45R, and the reflecting mirror 45B that are provided between the optical phase modulator 11 and the phosphor section 20.

The branching optical system 44 causes an optical path of the excitation light from the excitation light source 31W entering via the excitation-light intensity distribution generation section 10 into three optical paths.

On a first optical path resulting from branching caused by the branching optical system 44, the reflecting mirror 45R, the red phosphor section 21R, the red illumination optical system 40R, the reflecting mirror 43R, and the red image display device 51R are provided in order.

On a second optical path resulting from branching caused by the branching optical system 44, the reflecting mirror 45B, the blue phosphor section 21B, the blue illumination optical system 40B, the reflecting mirror 43B, and the blue image display device 51B are provided in order.

On a third optical path resulting from branching caused by the branching optical system 44, the green phosphor section 21R, the green illumination optical system 40G, and the image display device 51G are provided in order.

The optical phase modulator 11 varies the intensity distribution of the excitation light to bring the intensity distribution of the excitation light closer to the desired excitation-light intensity distribution. Light of the desired fluorescent light-emission intensity distribution derived from the fluorescent light emission is thereby outputted from the phosphor section 20. As a result, each of the red image display device 51R, the green image display device G, and the blue image display device 51B is irradiated with the illumination light of the corresponding color of the desired illumination-light intensity distribution via the illumination optical system 40.

The red image display device 51R, the green image display device G, and the blue image display device 51B each generate a projection image of the corresponding color, with respect to the illumination light of the corresponding color. The projection image of the color of each of the red light, the green light, and the blue light is subjected to color composition by an unillustrated color composition optical system, and is outputted toward the projection lens 53. The projection lens 53 projects the projection image subjected to the color composition onto the projection surface such as the screen 50.

Fourth Specific Example of Optical System

FIG. 5 illustrates an outline of an optical system of a projector 101D according to a fourth specific example.

In the projector 101B illustrated in FIG. 3, there is provided a configuration in which the illumination optical system 40 is disposed on the optical path after the color separation by the color separation section 41. In contrast, in the projector 101D illustrated in FIG. 5, the illumination optical system 40 is disposed also on an optical path before the illumination optical system 40 is subjected to the color separation by the color separation section 41.

Other configurations may be similar to those of the projector 101B in FIG. 3.

It is to be noted that, with respect to the configuration of the projector 101D illustrated in FIG. 5, there may be provided such a configuration that the illumination optical system 40 on the optical path after the color separation by the color separation section 41 is omitted, and the illumination optical system 40 is disposed only on the optical path before the color separation by the color separation section 41.

Fifth Specific Example of Optical System

FIG. 6 illustrates an outline of an optical system of a projector 101E according to a fifth specific example.

The projector 101E illustrated in FIG. 6 uses the excitation light source 31B that emits the blue light as the excitation light, in place of the excitation light source 31W in the projector 101A illustrated in FIG. 2. The excitation light source 31B is a laser light source that emits, for example, blue light of a wavelength from about 440 nm to about 470 nm. Further, the projector 101E illustrated in FIG. 6 is provided with a blue light emission surface 22B', in place of the blue fluorescent light-emission surface 22B of the phosphor wheel 21 in the projector 101A illustrated in FIG. 2. The blue light emission surface 22B' is a diffusion light emission surface using a diffusion material that diffuses the blue light from the excitation light source 31B, in place of the blue phosphor.

Other configurations may be similar to those of the projector 101A in FIG. 2.

Sixth Specific Example of Optical System

FIG. 7 illustrates an outline of an optical system of a projector 101F according to a sixth specific example.

The projector 101F illustrated in FIG. 7 includes a red light source 31R, in addition to the excitation light source 31B in the projector 101B illustrated in FIG. 3. The excitation light source 31B emits the blue light as the excitation light. The red light source 31R emits red light. The excitation light source 31B is a laser light source that emits, for example, blue light of a wavelength from about 440 nm to about 470 nm. The red light source 31R is a laser light source that emits, for example, red light of a wavelength from about 620 nm to about 650 nm. There is a case where the red light is insufficient, when only the combination of the excitation light source 31B emitting the blue light and the fluorescent light-emission surface 22 is used as in the configuration of the projector 101B illustrated in FIG. 3. In contrast, adding the red light source 31R as in the projector 101F illustrated in FIG. 7 makes it possible to supplement a red component that is insufficient when only the fluorescent light emission is used. This makes it possible to obtain a projection image having a wider color gamut.

Other configurations may be similar to those of the projector 101B in FIG. 3.

Modification Examples of Each Specific Example

It is to be noted that, in the above-described specific examples, the configuration using the transmission-type image display device is described as a specific example of the image display device 51, but a configuration using a reflection-type image display device may be adopted. The reflection-type image display device may be a reflection-type liquid-crystal display panel, a reflection-type DMD, a reflection-type MEMS, or the like.

Further, in the above-described specific examples, the example of the transmission-type phase modulation liquid crystal panel is used for a specific example of the optical phase modulator 11, but the optical phase modulator 11 may include a reflection-type phase modulation liquid crystal panel.

Furthermore, in the above-described specific examples, the configuration example using only the one optical phase modulator 11 is described, but a configuration using the plurality of optical phase modulators 11 may be adopted. For example, in the configuration of the above-described third specific example, the optical phase modulator 11 may be disposed on each of the first to third optical paths of the respective colors of the red phosphor section 21R, the green phosphor section 21G, and the blue phosphor section 21B, and the intensity distribution of the excitation light may be varied for each of the colors of R, G, and B.

1.3 Configuration Examples of Light-Ray-Angle Modulator

FIG. 8 illustrates a configuration example of a main portion of an illumination unit using a light-ray-angle modulator 13. FIG. 9 illustrates a specific configuration example of the light-ray-angle modulator 13.

In the specific examples in FIG. 2 to FIG. 7, the configuration example using the optical phase modulator 11 in the excitation-light intensity distribution generation section 10 is described, but the light-ray-angle modulator 13 illustrated in FIG. 8 and FIG. 9 may be used in place of the optical phase modulator 11.

FIG. 8 illustrates a configuration example in which the light-ray-angle modulator 13 is disposed, for example, between the excitation light source 31B that outputs the blue light and the phosphor wheel 21A including the fluorescent light-emission surface 22 that converts the blue light into the yellow light. However, a configuration of an optical system to which the light-ray-angle modulator 13 is applied is not limited to this example.

The light-ray-angle modulator 13 has a configuration including a mirror array that includes a plurality of micro-mirrors 14 as illustrated in, for example, FIG. 9. Further, the light-ray-angle modulator 13 includes two or more piezo-electric devices 15 that adjust angles of the respective micromirrors 14. This makes it possible to vary an entering angle of the excitation light with respect to the fluorescent light-emission surface 22.

The light-ray-angle modulator 13 is controlled by the drive controller 70 on the basis of the image signal Vin, in a manner approximately similar to that of the projector 101A in FIG. 2, although not illustrated. The drive controller 70 controls the two or more piezoelectric devices 15 to so vary the intensity distribution of the excitation light on the fluorescent light-emission surface 22 to bring the intensity distribution of the excitation light on the fluorescent light-emission surface 22 closer to the desired excitation-light intensity distribution.

1.4 Configuration Examples of Illumination Optical System

FIG. 10 illustrates a first configuration example of the illumination optical system 40. Further, FIG. 11 illustrates a second configuration example of the illumination optical system 40. It is to be noted that FIG. 10 and FIG. 11 each illustrate the configuration example using the phosphor wheel 21A including the fluorescent light-emission surface 22 that converts the blue light into the yellow light as the phosphor section 20, but a configuration of the phosphor section 20 is not limited to this example.

FIG. 10 illustrates the configuration example of the illumination optical system 40 in a case where an image display device 54 including an MEMS is used. In the case of the image display device 54 including the MEMS, for example, an image-formation optical system 46 illustrated in FIG. 10 is used for the illumination optical system 40.

FIG. 11 illustrates the configuration example of the illumination optical system 40 in a case where an image display device 55 including a liquid crystal display device is used. In the case of the image display device 54 including the liquid crystal display device, an optical system in which a PS (polarization) converter 49 is disposed between a condensing lens 47 and a condensing lens 48 is used for the illumination optical system 40, as illustrated in, for example, FIG. 11.

1.5 Configuration Examples of Phosphor Section

Next, a configuration example of the phosphor section 20 is described. A case where the fluorescent light-emission surface of the phosphor section 20 is of a reflection type is described below as an example.

The phosphor of the phosphor section 20 may be, for example, a CASN, SCASN, or the like. The CASN or SCASN is a phosphor that emits red light using blue light as the excitation light.

Further, in the phosphor section 20, a Ce:YAG phosphor, a Ce:LAG phosphor, a SiALON (SiALON) phosphor, or the like may be used for a phosphor that emits yellow light using blue light as the excitation light.

Further, the phosphor of the phosphor section 20 may be a quantum dot phosphor or the like.

FIG. 12 illustrates a first specific example of the configuration of the phosphor section 20.

In a phosphor section 120A illustrated in FIG. 12, a fluorescent light-emission surface has a binderless particle accumulated structure. The phosphor section 120A has such a structure that a particulate water glass 123 or the like in which a phosphor 122 is dispersed is accumulated on a wheel base 121 including, for example, aluminum. In this structure, it is desirable that an air layer 124 (a cavity portion) occupy 10% or more of the fluorescent light-emission surface.

According to the phosphor section 120A having such a particle accumulated structure, it is possible to suppress spread of the fluorescent light emission with respect to the excitation light to the minimum. This makes it possible to obtain a sharper illumination-light intensity distribution, and to enhance quality of a projection image, in the image display device 51. It is also possible to reduce a decline in intensity of the illumination light at an edge portion of the image display device 51, thereby making it possible to increase utilization efficiency of the illumination light in the illumination optical system 40.

FIG. 13 illustrates a second specific example of the configuration of the phosphor section 20.

In a phosphor section 120B illustrated in FIG. 13, a fluorescent light-emission surface has a resin binder structure. The phosphor section 120B has such a structure that a silicon resin 125 in which the phosphor 122 is dispersed is stacked on the wheel base 121 including, for example, aluminum.

In the phosphor section 120B having such a resin binder structure, light L1 derived from the fluorescent light emission is more easily diffused as a result of internal reflection on the fluorescent light-emission surface, as compared with the phosphor section 120A having the particle accumulated structure described above.

FIG. 14 illustrates a third specific example of the configuration of the phosphor section 20.

A phosphor section 120C illustrated in FIG. 14 has such a structure that a ceramic phosphor 126 is stacked on the wheel base 121 including, for example, aluminum.

In the phosphor section 120C having such a structure, light derived from the fluorescent light emission easily spreads on the fluorescent light-emission surface, as compared with the phosphor section 120A including the above-described particle accumulated structure.

1.6 Computation Examples of Excitation-Light Intensity Distribution

FIG. 15 illustrates an example of a relationship between the excitation-light intensity distribution of the excitation light entering the phosphor section 20 and the fluorescent light-emission intensity distribution derived from the fluorescent light emission in the phosphor section 20.

As illustrated in FIG. 15, the fluorescent light-emission intensity distribution has such a shape that a beam cross-section widens in a width direction with respect to the excitation-light intensity distribution. A width of this widening depends on a light-emission characteristic of the phosphor section 20. The light-emission characteristic of the phosphor section 20 depends on a structure of the fluorescent light-emission surface of the phosphor section 20. For example, as described above, in the phosphor section 120B including the resin binder structure, a beam cross-section easily widens, as compared with the phosphor section 120A including the particle accumulated structure described above.

The drive controller 70 (see FIG. 2) may be a computing section that determines the desired excitation-light intensity distribution on the basis of the image signal Vin.

FIG. 16 illustrates an example of computation performed by the drive controller 70 serving as the computing section to determine the desired excitation-light intensity distribution from the desired illumination-light intensity distribution on the basis of the image signal Vin.

The drive controller 70 determines the desired illumination-light intensity distribution for irradiation of the image display device 51 on the basis of the image signal Vin, and determines the desired fluorescent light-emission intensity distribution derived from the fluorescent light emission on the basis of the determined desired illumination-light intensity distribution. Further, the drive controller 70 determines the desired excitation-light intensity distribution on the basis of the determined desired fluorescent light-emission intensity distribution.

The drive controller 70 determines the desired fluorescent light-emission intensity distribution, on the basis of the determined desired illumination-light intensity distribution, and a variation amount of an intensity distribution of the illumination light with respect to an intensity distribution of the light derived from the fluorescent light emission to be determined on the basis of light-emission characteristic of the illumination optical system.

The drive controller 70 determines the desired excitation-light intensity distribution, on the basis of the determined desired fluorescent light-emission intensity distribution, and a variation amount (see FIG. 15) of the intensity distribution of the light by the fluorescent light emission with respect to the intensity distribution of the excitation light to be determined on the basis of light-emission characteristic of the fluorescent light-emission surface.

1.7 Specific Configuration Example Including Control System of Illumination Unit and Projector Next, a specific configuration example including a control system of the illumination unit and the projector is described.

It is to be noted that, in the following specific example, components approximately the same as those of the projector 101 in FIG. 1 or the like are denoted by the same reference numerals, and the description thereof is omitted where appropriate.

Figure 17:
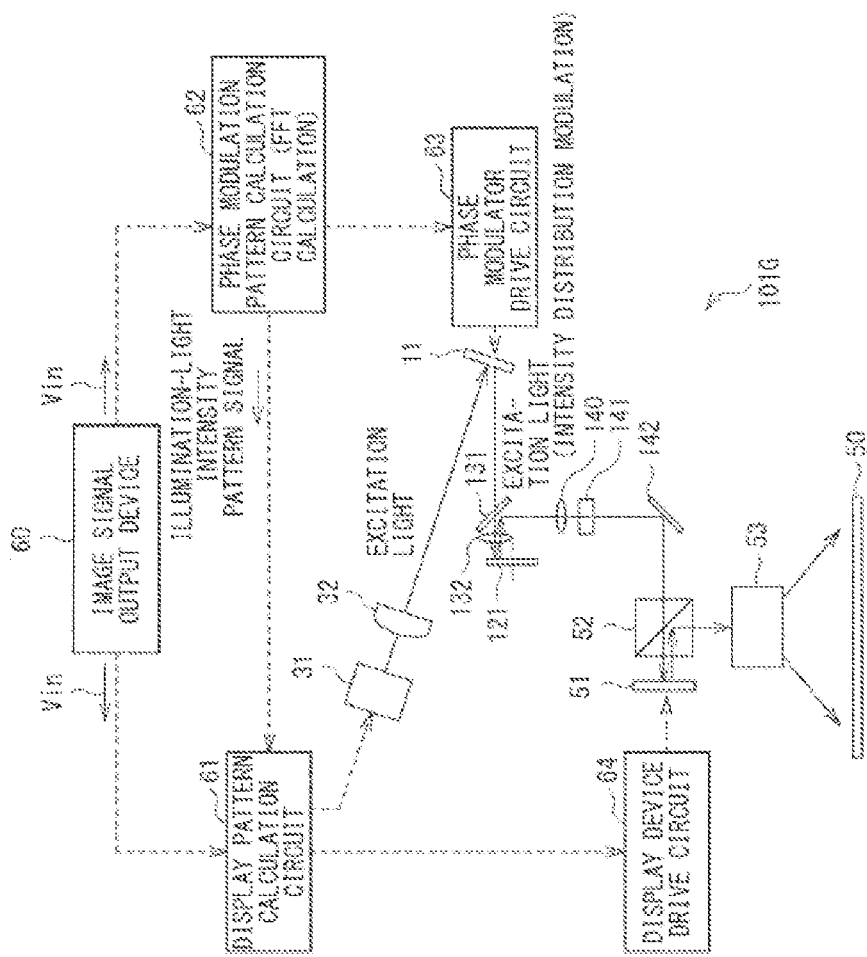
FIG. 17 is a configuration diagram illustrating a configuration example including a control system of the illumination unit and the projector according to the first embodiment.

FIG. 17 illustrates a configuration example including a control system of the illumination unit and the projector according to the first embodiment.

A projector 101G includes an image signal output device 60, a display pattern calculation circuit 61, a phase modulation pattern calculation circuit 62, a phase modulator drive circuit 63, and a light intensity modulator drive circuit 64. The projector 101G further includes the optical phase modulator 11, the excitation light source 31, a beam shaping optical system 32, the image display device 51, a polarizing beam splitter (PBS) 52, and the projection lens 53. The projector 101G further includes a half mirror 131, a condensing optical system 132, a phosphor wheel 121 serving as the phosphor section 20, an illumination optical system 140, and a PS (polarization) converter 141, and a reflecting mirror 142.

The excitation light source 31 is, for example, a laser light source. The beam shaping optical system 32 is an excitation optical system that irradiates the optical phase modulator 11 with the excitation light emitted from the excitation light source 31. The optical phase modulator 11 includes, for example, a spatial optical phase modulator such as an SLM. The optical phase modulator 11 so varies the intensity distribution of the excitation light as to bring the intensity distribution of the excitation light closer to the desired excitation-light intensity distribution.

The phosphor wheel 121 includes a reflection-type fluorescent light-emission surface. The fluorescent light-emission surface of the phosphor wheel 121 is irradiated with the excitation light of the desired excitation-light intensity distribution generated by the optical phase modulator 11, via the half mirror 131 and the condensing optical system 132. The light of the desired fluorescent light-emission intensity distribution derived from the fluorescent light emission is thereby outputted from the phosphor wheel 121. As a result, the image display device 51 is irradiated with the illumination light of the desired illumination-light intensity distribution, via the illumination optical system 140, the PS converter 141, the reflecting mirror 142, and the polarizing beam splitter 52.

The image signal output device 60 outputs the image signal Vin to the display pattern calculation circuit 61 and the phase modulation pattern calculation circuit 62.

In the phase modulation pattern calculation circuit 62, a phase modulation pattern in the optical phase modulator 11 is calculated on the basis of the image signal Vin. The phase modulation pattern in the optical phase modulator 11 is a pattern to reproduce the desired excitation-light intensity distribution described above with reference to FIG. 15 and FIG. 16.

It is to be noted that, in the description of FIG. 15 and FIG. 16, the drive controller 70 (see FIG. 2) is described as the computing section that determines the desired excitation-light intensity distribution, but, here, the phase modulation pattern calculation circuit 62 serves as the computing section that determines the desired excitation-light intensity distribution. In the phase modulation pattern calculation circuit 62, for example, a phase modulation pattern is calculated by an FFT (fast Fourier transform) calculation. Further, the phase modulation pattern calculation circuit 62 outputs an illumination light intensity modulation pattern signal to the display pattern calculation circuit 61. The illumination light intensity modulation pattern signal represents information indicating the desired illumination-light intensity distribution determined on the basis of the image signal Vin.

The phase modulator drive circuit 63 so drives the optical phase modulator 11 as to display the phase modulation pattern calculated in the phase modulation pattern calculation circuit 62.

In the display pattern calculation circuit 61, an intensity modulation pattern for generation of an image to be displayed by the image display device 51 is calculated on the basis of the image signal Vin. At this time, the intensity modulation pattern to which the information indicating the desired illumination-light intensity distribution derived from the optical phase modulator 11 is taken into consideration is calculated.

The light intensity modulator drive circuit 64 drives the image display device 51 to generate the intensity modulation pattern calculated in the display pattern calculation circuit 61.

The polarizing beam splitter 52 allows a first polarization component of the entering light to pass therethrough, and reflects a second polarization component orthogonal to the first polarization component. The image display device 51 is irradiated with the illumination light of the above-described desired illumination-light intensity distribution, via the polarizing beam splitter 52. The image display device 51 performs intensity modulation on the illumination light on the basis of the intensity modulation pattern calculated in the display pattern calculation circuit 61, and thereby generates a projection image. As described above, the information indicating the desired illumination-light intensity distribution is taken into consideration to the intensity modulation pattern calculated in the display pattern calculation circuit 61. Therefore, as a result, a projection image that reproduces the original image signal Vin is generated by the image display device 51.

The projection image generated by the image display device 51 is outputted toward the projection lens 53 by the polarizing beam splitter 52. The projection lens 53 is a projection optical system including a plurality of lenses, and projects the projection image generated by the image display device 51 onto the projection surface such as the screen 50.

1.8 Effects

As described above, according to the present embodiment, the illumination light is generated on the basis of the light derived from the fluorescent light emission generated by the excitation light of the desired excitation-light intensity distribution. It is therefore possible to obtain the desired illumination-light intensity distribution in which speckles are reduced.

According to the present embodiment, it is thereby possible to efficiently increase the dynamic range of the projection image. In general, speckles peculiar to laser is generated in a case where a laser light source is used for a light source. According to the present embodiment, the desired illumination-light intensity distribution derived from the fluorescent light emission is generated by using the light emitted by the laser light source as the excitation light. Therefore, a substantially speckleless state is achieved, and image quality of the projection image is superior.

It is to be noted that the effects described herein are merely illustrative and not limitative, and other effects may be provided. This also holds true for effects of subsequent other embodiments as described hereinbelow.

2. Second Embodiment

Next, an illumination unit and a projector according to a second embodiment of the present disclosure are described. It is to be noted that, in the following, components approximately the same as those of the illumination unit and the projector according to the first embodiment described above are denoted by the same reference numerals, and the description thereof is omitted where appropriate.

2.1 Configurations and Operations

Figure 18:
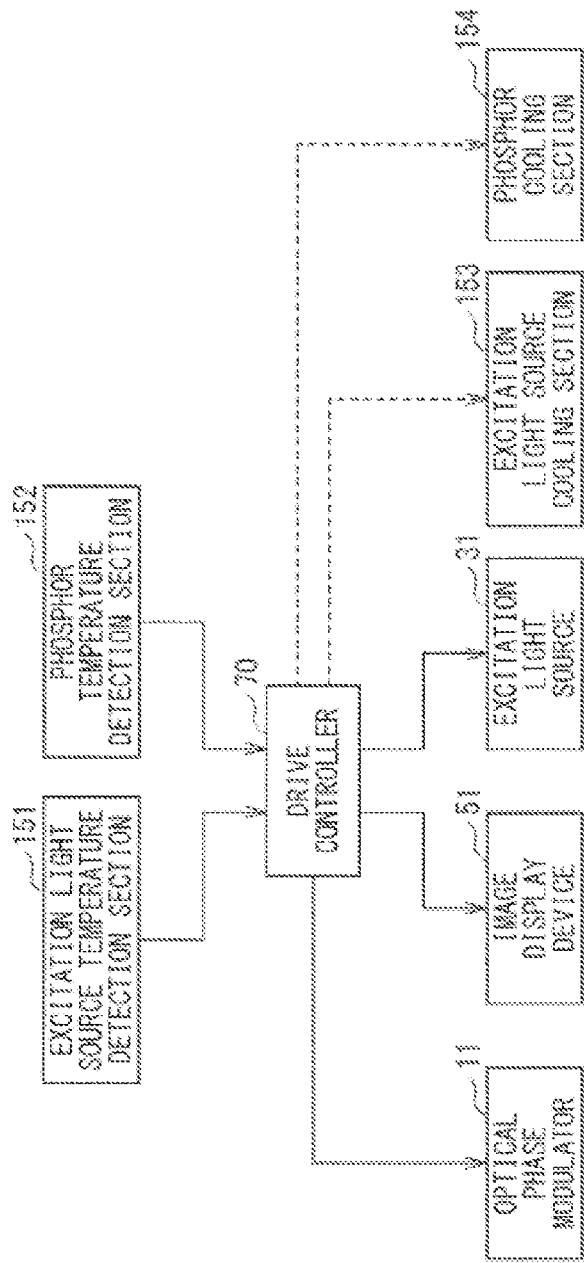
FIG. 18 is a configuration diagram schematically illustrating an example of a main portion of a control system of an illumination unit and a projector according to a second embodiment.
Figure 19:
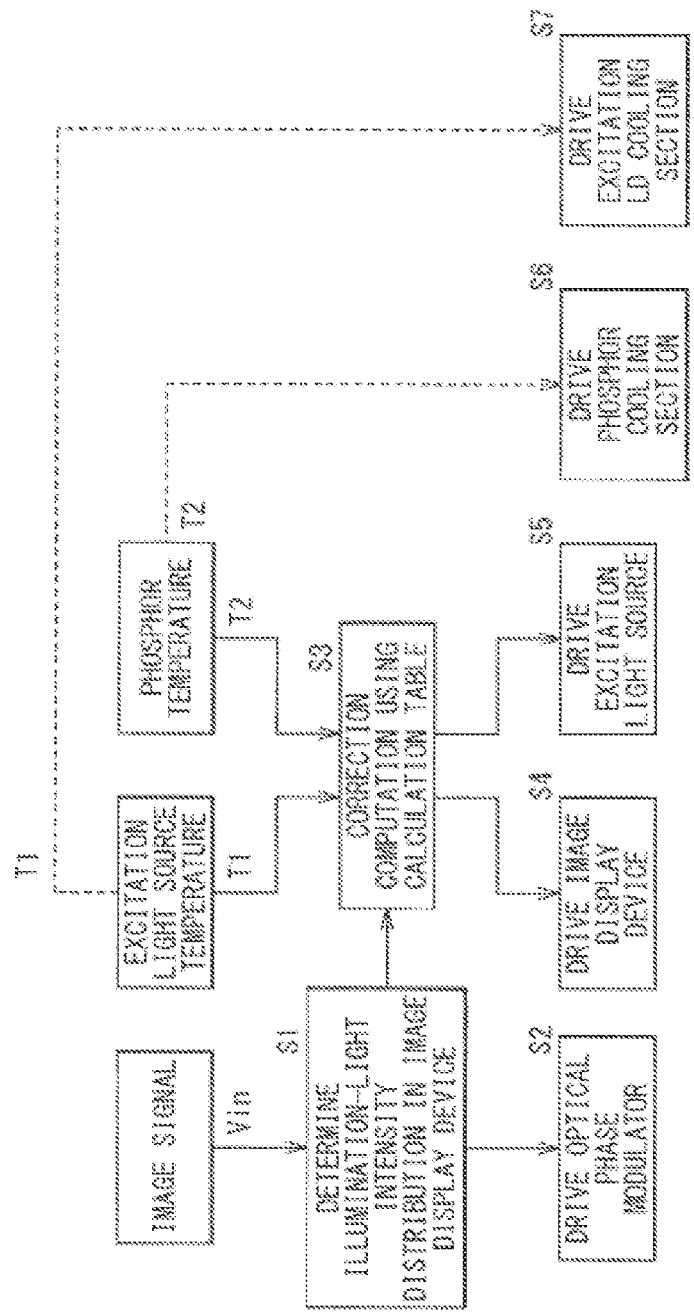
FIG. 19 is an explanatory diagram schematically illustrating an example of control operation of a main portion of the illumination unit and the projector according to the second embodiment.

FIG. 18 schematically illustrates a configuration example of a main portion of a control system of the illumination unit and the projector according to the second embodiment of the present disclosure. FIG. 19 schematically illustrates an example of control operation of a main portion of the illumination unit and the projector according to the second embodiment.

It is to be noted that, in FIG. 18, components approximately the same as those of the projector 101 in FIG. 1, the projector 101A in FIG. 2, or the like are denoted by the same reference numerals, and the description thereof is omitted where appropriate.

The projector according to the second embodiment includes a temperature detection section that detects a temperature of the excitation light source 31, the phosphor section 20, or both. For example, as illustrated in FIG. 18, an excitation light source temperature detection section 151 and a phosphor temperature detection section 152 are provided as the temperature detection section.

The projector according to the second embodiment may further include a cooling section that cools the excitation light source 31, the fluorescent light-emission surface of the phosphor section 20, or both. For example, an excitation light source cooling section 153 that cools the excitation light source 31 and a phosphor cooling section 154 that cools the fluorescent light-emission surface of the phosphor section 20 may be further provided.

As illustrated in FIG. 19, the drive controller 70 determines the desired illumination-light intensity distribution for irradiation of the image display device 51 on the basis of the image signal Vin (step S1). The drive controller 70 so drives the optical phase modulator 11 as to reproduce the desired excitation-light intensity distribution determined from the desired illumination-light intensity distribution (step S2).

Further, the drive controller 70 performs correction computation using a predetermined calculation table, on the basis of a detection result T1 (an excitation light source temperature) of the excitation light source temperature detection section 151, a detection result T2 (a phosphor temperature) of the phosphor temperature detection section 152, or both (step S3).

The drive controller 70 so corrects the image signal Vin on the basis of the detection result T1 of the excitation light source temperature detection section 151, the detection result T2 of the phosphor temperature detection section 152, or both as to correct color variation due to the temperature, and drives the image display device 51 on the basis of the corrected image signal Vin (step S4).

Further, the drive controller 70 so drives the excitation light source 31 on the basis of the detection result T1 of the excitation light source temperature detection section 151, the detection result T2 of the phosphor temperature detection section 152, or both as to correct the emission intensity of the excitation light (step S5).

Further, the drive controller 70 may drive the excitation light source cooling section 153 on the basis of the detection result T1 of the excitation light source temperature detection section 151 (step S6) to cool the excitation light source 31.

Further, the drive controller 70 may drive the phosphor cooling section 154 on the basis of the detection result T2 of the phosphor temperature detection section 152 (step S7) to cool the fluorescent light-emission surface of the phosphor section 20.

2.2 Effects

According to the present embodiment, it is possible to suppress color variation of the projection image due to temperature characteristics of the excitation light source 31 and the phosphor section 20. This makes it possible to perform image display using more accurate colors.

Other configurations, operations, and effects may be approximately similar to those of the illumination unit and the projector according to the above-described first embodiment.

3. Other Embodiments

The technology by the present disclosure can be modified in a variety of ways and implemented without being limited to the description of each of the above-described embodiments.

For example, the present technology can also include the following configurations. According to the present technology in the following configurations, illumination light is generated on the basis of light derived from fluorescent light emission generated by excitation light of a desired excitation-light intensity distribution. It is therefore possible to obtain a desired illumination-light intensity distribution with reduced speckles.

(1)

An illumination unit including:

an excitation light source that emits excitation light;

a phosphor section including a fluorescent light-emission surface that performs fluorescent light emission in response to receiving of the excitation light;

an excitation-light intensity distribution generation section that is provided between the excitation light source and the phosphor section, and varies an intensity distribution of the excitation light to bring the intensity distribution of the excitation light closer to a desired excitation-light intensity distribution on the fluorescent light-emission surface; and an illumination optical system that generates, on the basis of light derived from the fluorescent light emission from the phosphor section, illumination light with which an image display device is to be irradiated.

(2)

The illumination unit according to (1) described above, further including a computing section that determines the desired excitation-light intensity distribution on the basis of an image signal.

(3)

The illumination unit according to (2) described above, in which the computing section determines a desired illumination-light intensity distribution for irradiation of the image display device on the basis of the image signal, determines a desired fluorescent light-emission intensity distribution derived from the fluorescent light emission on the basis of the determined desired illumination-light intensity distribution, and determines the desired excitation-light intensity distribution on the basis of the determined desired fluorescent light-emission intensity distribution.

(4)

The illumination unit according to (3) described above, in which the computing section determines the desired excitation-light intensity distribution on the basis of the determined desired fluorescent light-emission intensity distribution and a variation amount of an intensity distribution of the light derived from the fluorescent light emission with respect to an intensity distribution of the excitation light determined on the basis of a light-emission characteristic of the fluorescent light-emission surface.

(5)

The illumination unit according to (3) or (4) described above, in which the computing section determines the desired fluorescent light-emission intensity distribution on the basis of the determined desired illumination-light intensity distribution and a variation amount of an intensity distribution of the illumination light with respect to an intensity distribution of the light derived from the fluorescent light emission determined on the basis of an optical characteristic of the illumination optical system.

(6)

The illumination unit according to any one of (1) to (5) described above, further including:

a temperature detection section that performs detection of a temperature of the excitation light source, the fluorescent light-emission surface, or both; and a controller that drives, on the basis of a result of the detection by the temperature detection section, the excitation light source to correct a light emission intensity of the excitation light.

(7)

The illumination unit according to any one of (1) to (6) described above, further including:

a temperature detection section that performs detection of a temperature of the excitation light source, the fluorescent light-emission surface, or both; and a cooling section that cools the excitation light source, the fluorescent light-emission surface, or both on the basis of a result of the detection by the temperature detection section.

(8)

The illumination unit according to any one of (1) to (7) described above, in which the excitation-light intensity distribution generation section includes an optical phase modulator that modulates a phase of the excitation light.

(9)

The illumination unit according to any one of (1) to (7) described above, in which the excitation-light intensity distribution generation section includes a light-ray-angle modulator that varies a light ray angle of the excitation light.

(10)

A projector including:
an illumination unit;
an image display device that modulates intensity of illumination light from the illumination unit to generate a projection image; and
a projection optical system that projects the projection image generated by the image display device onto a projection surface,
the illumination unit including
an excitation light source that emits excitation light,
a phosphor section including a fluorescent light-emission surface that performs fluorescent light emission in response to receiving of the excitation light,
an excitation-light intensity distribution generation section that is provided between the excitation light source and the phosphor section, and varies an intensity distribution of the excitation light to bring the intensity distribution of the excitation light closer to a desired excitation-light intensity distribution on the fluorescent light-emission surface, and
an illumination optical system that generates, on the basis of light derived from the fluorescent light emission from the phosphor section, the illumination light with which the image display device is irradiated.

(11)

The projector according to (10) described above, further including a controller that drives the image display device on the basis of an image signal, in which
the illumination unit further includes a temperature detection section that performs detection of a temperature of the excitation light source, the fluorescent light-emission surface, or both, and
the controller corrects the image signal to correct color variation due to a temperature on the basis of a result of the detection by the temperature detection section.

The present application claims the priority on the basis of Japanese Patent Application No. 2017-232299 filed with the Japan Patent Office on Dec. 4, 2017, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An illumination unit, comprising:
an excitation light source configured to emit excitation light;
a phosphor section, including a fluorescent light-emission surface, configured to emit fluorescent light based on reception of the excitation light;
a computing section configured to:
determine, based on an image signal, a specific illumination-light intensity distribution of illumination light to irradiate an image display device;
determine, based on the determined specific illumination-light intensity distribution, a specific fluorescent light-emission intensity distribution of light derived from the emission of the fluorescent light; and
determine a specific excitation-light intensity distribution of the excitation light based on the determined specific fluorescent light-emission intensity distribution;
an excitation-light intensity distribution generation section, between the excitation light source and the phosphor section, configured to time-divisionally vary an intensity distribution of the excitation light to bring the intensity distribution of the excitation light closer to the specific excitation-light intensity distribution on the fluorescent light-emission surface; and
an illumination optical system configured to generate, based on the light derived from the emission of the fluorescent light from the phosphor section, the illumination light to irradiate the image display device.

2. The illumination unit according to claim 1, wherein
the computing section is further configured to determine the specific excitation-light intensity distribution based on a variation amount of an intensity distribution of the light derived from the emission of the fluorescent light with respect to the intensity distribution of the excitation light, and
the variation amount is determined based on a light-emission characteristic of the fluorescent light-emission surface.

3. The illumination unit according to claim 1, wherein
the computing section is further configured to determine the specific fluorescent light-emission intensity distribution based on a variation amount of an intensity distribution of the illumination light with respect to an intensity distribution of the light derived from the emission of the fluorescent light, and
the variation amount is determined based on an optical characteristic of the illumination optical system.

4. The illumination unit according to claim 1, further comprising:
a temperature detection section configured to detect a temperature of at least one of the excitation light source or the fluorescent light-emission surface; and
a controller configured to drive, based on the detected temperature, the excitation light source to correct a light emission intensity of the excitation light.

5. The illumination unit according to claim 1, further comprising:
a temperature detection section configured to detect a temperature of at least one of the excitation light source or the fluorescent light-emission surface; and
a cooling section configured to cool at least one of the excitation light source or the fluorescent light-emission surface based on the detected temperature.

6. The illumination unit according to claim 1, wherein the excitation-light intensity distribution generation section comprises an optical phase modulator configured to modulate a phase of the excitation light.

7. The illumination unit according to claim 1, wherein the excitation-light intensity distribution generation section comprises a light-ray-angle modulator configured to vary a light ray angle of the excitation light.

8. A projector, comprising:
an illumination unit;
an image display device configured to:
modulate an intensity of illumination light from the illumination unit; and
generate a projection image based on the modulation of the intensity of the illumination light; and
a projection optical system configured to project the projection image onto a projection surface, wherein the illumination unit comprising:
an excitation light source configured to emit excitation light;
a phosphor section, comprising a fluorescent light-emission surface, configured to emit fluorescent light based on reception of the excitation light;
a computing section configured to:

determine, based on an image signal, a specific illumination-light intensity distribution of the illumination light to irradiate the image display device;

determine, based on the determined specific illumination-light intensity distribution, a specific fluorescent light-emission intensity distribution of light derived from the emission of the fluorescent light; and determine a specific excitation-light intensity distribution of the excitation light based on the determined specific fluorescent light-emission intensity distribution;

an excitation-light intensity distribution generation section, between the excitation light source and the phosphor section, configured to time-divisionally vary an intensity distribution of the excitation light to bring the intensity distribution of the excitation light closer to the specific excitation-light intensity distribution on the fluorescent light-emission surface; and an illumination optical system configured to generate, based on the light derived from the emission of the fluorescent light from the phosphor section, the illumination light to irradiate the image display device.

9. The projector according to claim 8, further comprising a controller configured to drive the image display device based on the image signal, wherein the illumination unit further comprises a temperature detection section configured to detect a temperature of at least one of the excitation light source or the fluorescent light-emission surface, and the controller is further configured to correct, based on the detected temperature, the image signal to correct color variation due to the temperature.

* * * * *